United States Patent
Eteläperä

(10) Patent No.: US 8,078,719 B2
(45) Date of Patent: Dec. 13, 2011

(54) METHOD AND APPARATUS FOR CHANGING DEVICE DURING ACTIVE CONNECTION

(75) Inventor: Esa Eteläperä, San Francisco, CA (US)

(73) Assignee: Nokia Corporation, Espoo (FI)

( * ) Notice: Subject to any disclaimer, the term of this patent is extended or adjusted under 35 U.S.C. 154(b) by 482 days.

(21) Appl. No.: 11/793,901

(22) PCT Filed: Dec. 7, 2005

(86) PCT No.: PCT/FI2005/050451
§ 371 (c)(1),
(2), (4) Date: Jun. 20, 2007

(87) PCT Pub. No.: WO2006/067278
PCT Pub. Date: Jun. 29, 2006

(65) Prior Publication Data
US 2008/0133757 A1    Jun. 5, 2008

(30) Foreign Application Priority Data
Dec. 20, 2004  (FI) ...................................... 20041630

(51) Int. Cl.
*G06F 13/00*    (2006.01)

(52) U.S. Cl. .................. 709/224; 709/225; 709/227
(58) Field of Classification Search ................ 713/170; 455/436, 437; 709/223, 224, 225, 227, 228
See application file for complete search history.

(56) References Cited

U.S. PATENT DOCUMENTS

| | | | |
|---|---|---|---|
| 6,999,769 B1 | 2/2006 | Henon | 455/445 |
| 7,191,233 B2* | 3/2007 | Miller | 709/227 |
| 7,487,248 B2* | 2/2009 | Moran et al. | 709/227 |
| 2002/0034947 A1* | 3/2002 | Soliman | 455/436 |
| 2003/0055977 A1 | 3/2003 | Miller | |
| 2003/0101343 A1* | 5/2003 | Eaton et al. | 713/170 |
| 2003/0154398 A1 | 8/2003 | Eaton et al. | |
| 2004/0068567 A1 | 4/2004 | Moran et al. | |
| 2005/0188095 A1* | 8/2005 | Gardiner et al. | 709/230 |

FOREIGN PATENT DOCUMENTS

| | | |
|---|---|---|
| WO | 0143459 | 6/2001 |
| WO | 03053089 | 6/2003 |
| WO | 03055259 | 7/2003 |
| WO | 2006/021846 | 3/2006 |

OTHER PUBLICATIONS

Extended European search report for corresponding EP app. No. 05817668.6-1525 dated Jul. 26, 2010, pp. 1-5.

* cited by examiner

*Primary Examiner* — Viet Vu
(74) *Attorney, Agent, or Firm* — Ditthavong Mori & Steiner, P.C.

(57) ABSTRACT

A method and apparatus are shown for changing a first device into a second device during a session. In the method according to the embodiments, information on the session is transmitted from the first device to the second device (102, 203, 206). Based on the received information, the second device is connected to the session (103, 208) and the first device is disconnected from the session (104, 204) such that the session is maintained.

21 Claims, 3 Drawing Sheets

METHOD AND APPARATUS FOR CHANGING DEVICE DURING ACTIVE CONNECTION

CROSS REFERENCE TO RELATED APPLICATIONS

This application is the U.S. National Stage of International Application Number PCT/FI2005/050451 filed Dec. 7, 2005, published in English on Jun. 29, 2006 under International Publication Number WO 2006/067278 and claiming priority from Finnish application 20041630 filed Dec. 20, 2004.

BACKGROUND OF THE INVENTION

1. Technical Field

The invention relates to changing a terminal device that is in active connection into another terminal device.

2. Discussion of Related Art

An active connection between two devices is typically a conventional talking connection. In addition, it is possible to discuss in active connection by delivering text format messages. An active connection requires that the parties accept the connection request and are simultaneously present in the connection. The connection can be private, such as a conversation connection between two parties. Then again, the connection can be a common discussion group, i.e. a channel, for example a continuously on-going discussion at a certain network site, which can be contacted by several participants each with his/her own personal device. Conversation connections can be continuous, long-lasting, such as typical common discussion groups, in which anyone can participate, or they can last for a certain time, such as one-to-one connections, which are created at the beginning of the conversation connection and terminated when the parties end the conversation connection. Typically in a conversation connection, text format data is used for communication, but today it is also possible to transmit sound or sound and video format data, as long as allowed by the available bandwidth and the software used. The connection created between the parties is typically called a session.

A conversation connection can be created for example with software called ICQ ("I Seek You"). Other providers of a similar service are Yahoo!®, AOL® and MicroSoft®. The software can be used to search for a certain user, to create a conversation connection with other users and to initiate connections between computers (PC, personal computer), between a computer and a portable device, or between portable devices, as well as to participate in these connections. The parties of the connection typically have the same connection software installed in their devices. Occasionally it is necessary to change the terminal device with which the connection has been initiated in the middle of an active conversation connection. For example, the user can change a session started with a computer into a portable terminal device, if the user needs to move away from his/her fixed computer. On the other hand, the connection of a portable terminal device can be weak in places, the receiving area may be poor, or the battery may be low. In such situations it may be desirable to transfer the session to a fixed device in order to ensure the maintenance of the connection.

According to the prior art technique, when it is desired to replace the device connected to a session with another, the original session is first terminated. After this, the new device is used to initiate, in place of the terminated session, a new session, to which the user logs in. Thus the user must always start a new session when changing the device. A new session needs to be created and the created session must be logged into.

SUMMARY OF INVENTION

The object of the invention is to change a device with another device during a session such that this session remains unchanged.

The object is so achieved that during a session, session information is transmitted from a first device currently connected to the session to another device, with which the session is established based on this information.

In the method according to the embodiments of the invention, a first device is changed into a second device during a session such that the session is maintained. In one embodiment session information is transferred from a first device to a second device, after which, based on the transmitted information, the second device is connected to the session and the first device is disconnected from the session.

An apparatus according to the embodiments of the invention for transferring a session from a first device to a second device during a session comprises means for transmitting the session information from the first device to the second device during the session. Typically the information is transmitted via a wireless connection or a gateway created between the devices. The apparatus also comprises means for connecting the second device to the session based on the transmitted information, and means for disconnecting the first device from the session.

In one embodiment of the invention, information on the last messages delivered in the session as well as information on the participants of the connection are transferred from the first device connected to the session to the second device. In addition, technical information related to the session, such as devices participating in the connection, message formats used, connections and protocols, is transferred to the second device. Based on these the second device is connected to the session. The information on the session and the user remain unchanged, but the device information of the session now corresponds to the information of this second device. The second device is connected to the session between the same participants who took part in the original conversation connection. The last messages delivered in the session are typically displayed on the second device exactly as if they had been sent/received with this second device.

According to one embodiment of the invention, information on the session and its participants is transferred from the first device to the second device via a wireless short range connection. Information can be transmitted via any connection created between the first and the second device. The connection can also be made fixed for example via a cable.

According to one embodiment, a first device is changed into a second device during a session as a response to a command entered by the user from the second device. According to another embodiment, a first device is changed into a second device during a session as a response to a detected activation of the second device, which is an indication of its use, and/or inactivation of the first device, which is an indication of its non-use. According to a third embodiment, a device is changed into a second device during a session as a response to a detection of an increased distance between the devices. Alternatively, a device is changed into a second device during a session as a response to a detection of a decreased distance between the devices.

The advantage of the method and apparatus according to the embodiments of the invention is the changeability of the devices during an existing active session. The user may want to change the device for example due to changed conditions, temporary inoperability of the device or his/her need of moving. According to the invention, the user does not need to log in again or start a new session, but he/she can continue the existing session with another device. In addition, the other parties of the session are not disturbed, and are not necessarily even conscious of the device change according to the embodiments. According to the embodiments, during the session the user can change his/her terminal device into another device of another type without this device change influencing in any way the session detected by the user.

BRIEF DESCRIPTION OF THE DRAWINGS

The embodiments of the invention are discussed below in more detail by making reference to the enclosed drawings, in which.

DETAILED DESCRIPTION OF THE INVENTION

Some embodiments of the invention are described below by making reference to the figures, which henceforth make a part of the description. The embodiments illustrate examples in which the invention can be carried out. It is possible to utilize also other embodiments than those set forth here and they can contain both structural and functional modifications without departing from the scope of protection defined in the independent claims of the invention.

Figure 1:
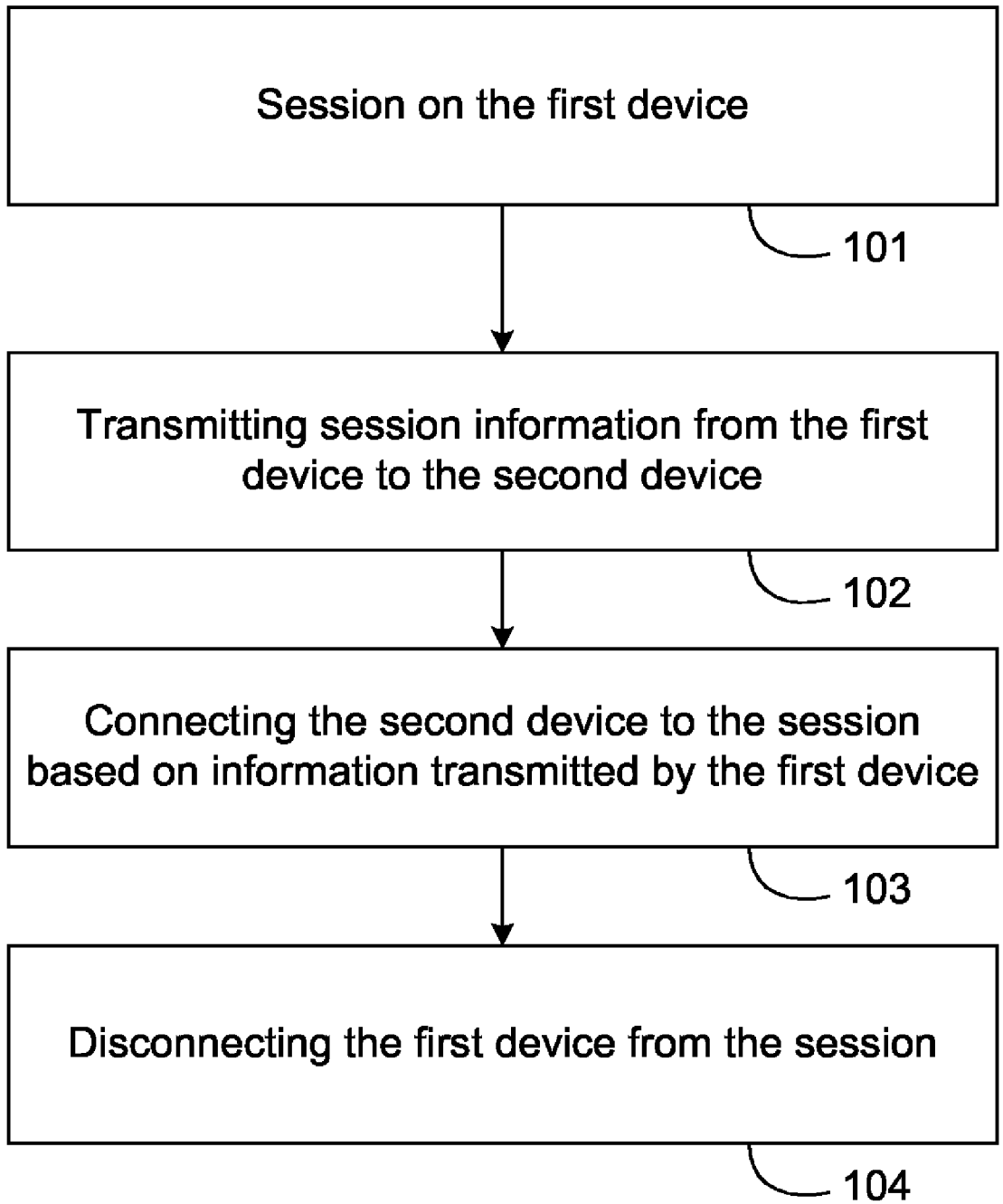
FIG. 1 illustrates a method according to one embodiment of the invention.

FIG. 1 shows a method according to one embodiment for changing a terminal device during a session in such a way that the created session remains the same and does not terminate as the terminal device changes. In step 101 the first device is involved in the session. The device can be used for example for creating simple short messages, which are immediately delivered to the view of other users actively connected (on-line) to the session. When the user of the first device wants to replace the first device connected with a second device during the session, information on the session is transmitted in step 102 from the first device to the second device. Besides the information related to the technical connection data and participant data, the latest messages delivered in the connection are generally transferred from the first device connected to the session to the second device. The latest messages are then displayed to the user on the second device. According to one embodiment, information is transmitted from the first device to the second device via a short range connection, e.g. a Bluetooth® connection. The connection used may be alternatively implemented with a cable or a corresponding wired connection, an infrared connection or any wireless connection established with the device.

In step 103 the second device is connected to the session based on the information transmitted by the first device. Typically carried out simultaneously or immediately after this is step 104, in which the session in the first device is terminated, i.e. the first device is disconnected from the session. The first device is changed into the second device by carrying out steps 103 and 104. The session in the second device in step 103 is created based on the information, which was transmitted in step 102 from the first device to the second device. According to one embodiment, a first device is changed into a second device during a session as a response to a command entered by the user from the second device.

According to another embodiment, after the information related to the session is transmitted from the first device to the second device according to step 102, the first device is changed into the second device during the session as a response to a detection that the input means of the second device are activated, that is, the user uses them, and correspondingly, the input means of the first device are inactive, that is, they are not used anymore.

According to a third embodiment, a first device is changed into a second device during a session as a response to an increase in the distance between the first and the second device. For example, when the user changes the device during a session from a fixed desktop computer into a portable device, he/she probably does this for being able to move freely. In this case, when the user transfers information on the session according to some embodiments of the invention to a portable device, it is very likely that the distance between the first fixed device and the second portable device increases. Alternatively, a first device is changed into a second device during a session as a response to a decrease in the distance between the first and the second device. For example, when the user is arriving at home he/she may change the device during a session from a portable device into a fixed device or another portable device being located at home. It is very likely that the distance between the first device and the second device decreases. In this case, when the user transfers information on the session according to some embodiments of the invention to the fixed or other portable device, the connection is automatically transferred from the first device to the second device.

According to still another embodiment when the user of the first device wants to replace the first device connected with a second device during the session which second device is further connected to a third device, information on the session is transmitted in step 102 from the first device to the second and further to the third device. Besides the information related to the technical connection data and participant data, the latest messages delivered in the connection are generally transferred from the first device connected to the session to the second device and further to the third device. The latest messages are then presented to the user on the third device. All embodiments described above with reference to step 102 to 104 of FIG. 1 are also applicable.

Figure 2A:
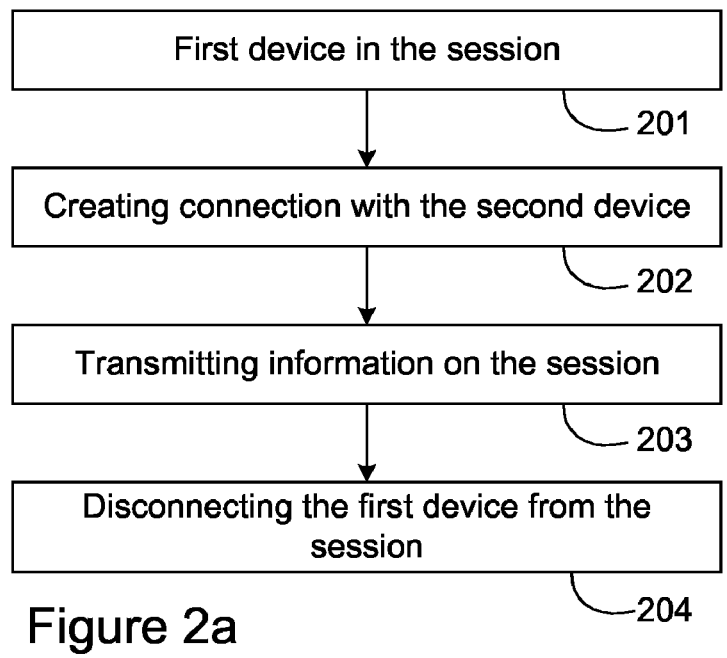
FIG. 2a illustrates a method according to one embodiment of the invention in a first device.

FIG. 2a shows in more detail the method in the first device. First in step 201, the device is involved in the session. The connection (instant messaging, IM) enables a message exchange with other users connected to the same session in real-time. The messages delivered by the users connected to the session are displayed on the user's device in chronological order. The participants are connected to each other directly via their devices or via servers. The users' devices have compatible application programs, which communicate with each other or with a connecting server for creating and maintaining a connection and/or a session. The servers are typically administered by an Internet service provider.

When the user wants to change the terminal device, but still continues the already existing session and/or connection, the user creates a connection from his/her own first device connected to the session into the second device, to which he/she wants to transfer the session in step 202. A typically used connection bus is a short-range connection, because a short range is sufficient in this situation, as both devices are then available for the user. Typically the connection between the user's first and second device is created via a different connection bus than the already existing active session. It is possible to transmit information on the connection for example by means of sms (short message service) or mms (multimedia messaging service) messages between the devices. The connection to the second device is created during the session.

In step 203 information on the session is transmitted via the connection bus created in step 202. In step 203, identifications of the parties of the session and the device identification, for example, are transmitted from the first device to the second device. In addition, it is possible to transmit address data and other identification data used in the session. The latest exchanged messages are also typically delivered to the second device. After the last exchanged messages have been delivered to the second device, the second device can display them to the user just as if they had originally arrived to this second device.

According to one embodiment, the user gives a command manually for changing the device. As a response to this command the first device is disconnected from the session 204. In the first device the device change, i.e. a connection transfer to the second device, thus ultimately means a termination of the original session in the first device according to step 204. Typically the user's second device is connected to the current session before this or at the same time.

According to another embodiment, the disconnection of the first device from the session as per step 204 is carried out on detecting that the input means of this first device are inactive, and correspondingly, the input means of the second devices are detected active. The input means, such as a keyboard, are inactive, when the user does not use them, that is, when no inputs are entered via them. Likewise, when the user enters for example text via the keyboard of the second device, this keyboard is detected active. According to the embodiment, activity of the input means indicates a change of device (use), as a response to which the device change is completed.

According to a third embodiment, the disconnection of the first device from the session as per step 204 is carried out on detecting that the distance between the devices increases. When the user's first device, which is involved in the session, is a fixed desktop computer and the second device is a portable device, an increased distance between the devices is an indication according to the embodiment of that the user has shifted to using his/her portable device. Alternatively, the disconnection of the first device from the session as per step 204 is carried out on detecting that the distance between the devices decreases. When the user's first device, which is involved in the session, is a portable device and the second device is a fixed desktop computer or portable device, a decreased distance between the devices is an indication according to the embodiment of that the user has shifted to using his/her portable device In this embodiment the position information of the devices is compared after the information on the session according to the embodiments has been transmitted from the first device to the second device in step 203. Typically step 204 is carried out in the first device as a response to the indication of the device change, which is first detected. All mentioned and other similar possible detections indicating a device change can thus be used simultaneously. The indications can also be prioritized such that a given indication is primarily checked and implemented. The prioritization can be made device-specifically, or the software can determine the order of importance of the devices or indications.

Figure 2B:
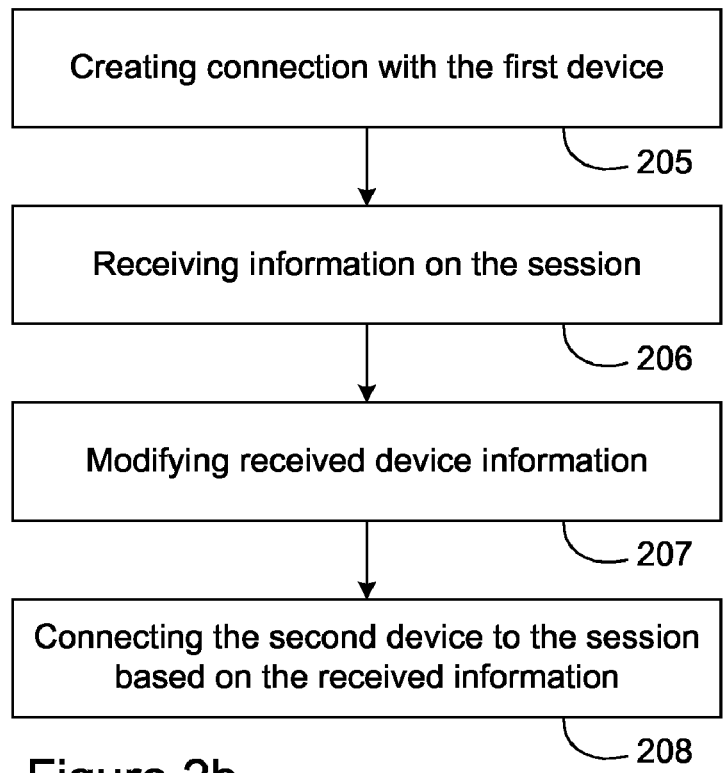
FIG. 2b illustrates a method according to one embodiment of the invention in a second device.

FIG. 2b shows a method in the second device, to which the connection is transferred. In step 205 a connection is created to the first device. The connection request comes from the first device. Step 205 is carried out in case a bilateral active connection is created between the devices. If the first device transmits information on the session for example by means of messages, the connection is not created but instead the information related to the session, transmitted by the first device, is received according to step 206. Once the second device has received the required information on the connection, connection protocol, connection parties, identifications and messages in step 206, typically an acceptance notice is transmitted to the first device. Based on the notice the first device knows that the delivery has been successful and has been completed.

According to one embodiment, step 207 is carried out next, in which the received information is processed with the receiving second device. For example, the first device defined as a party of the session and the information related thereto can be replaced with the corresponding information of the second device. Identifications, message format, connection bus and other similar technical information is typically modified such that based on the modified information the other party of the session is in fact this second device, although the other information related to the user and the active connection remains the same. According to one embodiment, a new log-in is not required, but only the device information related to the session is modified to apply to the second device. Thus the session remains original and the change of the first device to the second device can be carried out during the session in the background. As a response to the indication of a device change, the second device is connected to the session based on the received, possibly modified information according to step 208. The last messages delivered in the connection are typically shown on the display of the second device just as if they had been sent via this second device. A device change is indicated by for example a manually entered command by the user to change the device, inactivation (non-use) of the first device and activation (use) of the second device, increased or decreased distance between the devices or for example switching off of the first device.

According to still another embodiment the received information is processed with the receiving second device, which second device is further connected to a third device, information on the session is transmitted from the second device further to the third device. Then as a response to the indication of a device change, the third device is connected via the second device to the session based on the received, possibly modified information according to step 208. The last messages delivered in the connection are then presented by output means of the third device just as if they had been sent via the second device. All other embodiments described above with reference to step 102 to 104 of FIG. 1 are also applicable.

The SIP protocol (Session Initiation Protocol) is typically used for implementing an interactive user session. Messages can also be delivered according to some other protocol, for example IMTP (Internet Message Transfer Protocol). Messages delivered according to the SIP protocol can contain multimedia elements, such as video, sound, conversation connections, games or virtual reality. SIP functions in the application layer of the OSI (Open Systems Interconnection) communication model, in which the communicating parties are identified, the service level and possible data syntax restrictions are determined, and checking the user's access rights and privacy are considered. With the SIP protocol services and connections can be initiated and received from any location and the network identifies the parties irrespective of their location. SIP determines the final system to be used in the session, the communication media and the media parameters as well as ensures the willingness of the party connected (called) to participate in the session. Once these factors are determined and ensured, SIP takes care of the maintenance and termination of the connection. The participants are identified by means of unique SIP identifications (SIP URL, Uniform Resource Locator).

SIP is a request-response protocol, which processes the server responses and the requests of the server clients. Here a server and a client are used to refer to a communication relationship between two software programs. A client is software which makes the request or a service request to the server software. The server software responds to the request or carries out the request. Alternative models illustrating the relations between the software programs are for example host/peripheral device (master/slave), in which the host device is responsible for all other programs, or peers (peer-to-peer), in which any of the two programs can initiate the event. Requests can be delivered via any transmission protocol, for example UDP (User Datagram Protocol), SCTP (Stream Control Transmission Protocol) or TCP (Transmission Control Protocol). For example, according to the TCP protocol, a message can be divided for the duration of the transmission into packages, which are reassembled into one message at the receiving end. The packages may arrive via different routes.

A protocol commonly used in conversation connections, SIMPLE (SIP for Instant Messaging and Presence Leveraging Extensions) is based on the SIP protocol. XMPP (Extensible Messaging and Presence Protocol) is based on the XML language (Extensible Markup Language) and it is also used in the Instant Messaging sessions. The protocol allows the users to be in active conversation connection with other users in the same network irrespective of differences in the users' operating environments or browsers. The XMPP protocol is a protocol between servers. According to one embodiment, the connected devices communicate via their own servers such that these servers communicate with each other according to the XMPP protocol, for example.

Figure 3:
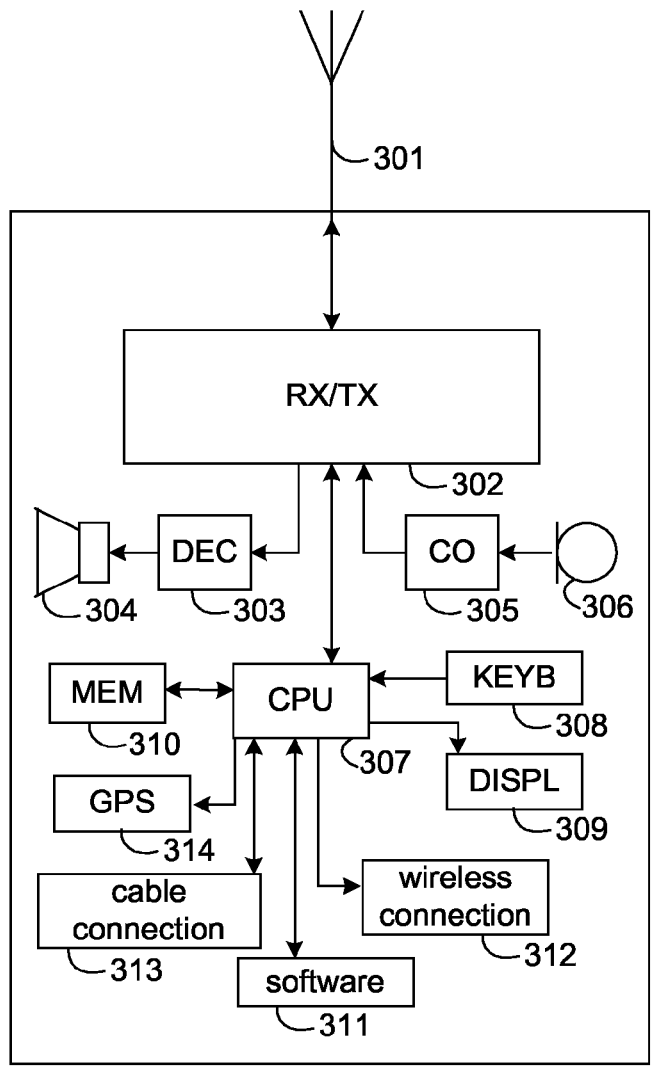
FIG. 3 illustrates a device according to one embodiment of the invention.

FIG. 3 shows a device according to one embodiment, which can participate in a session and which allows an interactive connection with another device. The device can be a portable or a fixed device. The device according to the embodiment comprises an antenna 301 and a transmission-reception block 302 for creating connections and delivering information to other devices or to a communication network. The device comprises a microphone 306 for inputting sounds and a coding block 305 for converting analog sounds to digital, such that they can be processed or delivered to the network. A speaker 304 is shown as sound reproduction equipment in the exemplifying device of FIG. 3. The device comprises a decoding block 303, which is used to decode sounds to analog form before playing them with the speaker 304. The devices may also comprise more advanced sound reproduction devices, such as MIDI (Musical Instrument Digital Interface) or MP3 (Media Player).

The device of FIG. 3 comprises a central processing unit 307, which is in connection with the other blocks of the device and takes care of their functions. As the user's data input device, a keyboard 308 is shown here. In the devices according to the embodiments, other known inputs and input devices can also be used, such as a mouse, optical input devices, touch input devices, sound input, and so on. For displaying data, the device of FIG. 3 comprises a display 309. The display can be used to display visible, picture format of graphical data. Possible sound data related to the display data or separate therefrom is naturally presented by means of the sound reproduction equipment 304 of the device.

The device of FIG. 3 comprises means for transferring session information, such as the latest messages delivered in the session and the information related to the participants of the session. Information can be sent and/or received via the established connection. The connection can be a connection established via the transmission-reception block 302 of the device, the antenna 301, or the network, in which data in various formats can be transmitted. The transmission format of the data depends on the transmitting and receiving device, on the data formats used by them, as well as on the communication network and its transmission protocols. The data can typically be transmitted as complete messages, data packages, in message format or as a data flow. The device of FIG. 3 comprises a cable connection 313, via which it can be connected to another device through a cable. In this case the data according to the invention can be transferred via a fixed cable connection. The device also comprises a wireless connection 312, which can be for example a connection panel for creating a short-range connection. A short-range connection can be for example a Bluetooth® connection, which is established between the first and second device for transferring the session information from the first device to the second device.

The device according to the embodiment comprises means for connecting the device to the session and for disconnecting it from the session. In addition, the device comprises means for displaying the latest messages delivered in the session. The session is created and implemented typically via a network. The device according to the embodiment comprises software 311 for carrying out the steps according to the embodiment of the invention. The software 311 also takes care of the processing and possible modification of the received information. Typically the session information received from the first device is treated such that, as regards the user's device information, the information of the first device is replaced with the information of the second device. Once the required device information and identifications and possibly new transmission method information and formats are replaced with the information of the second device, the user can continue the participation in the session via this second device. Typically the latest messages, which have been received from the first device, are displayed on a display 309.

According still another embodiment a second device comprises means for further connecting a third device to the session which third device is administered by the same user. In addition, the third device comprises means for repeating the latest messages delivered in the session via the second device. The session information received from the first device is delivered to the third device via the second device and the user can continue the participation in the session via this third device. Typically the latest messages, which have been received from the first device, are presented by output means of the third device.

FIG. 3 shows a keyboard 308 for entering the user commands. The software 311 according to the embodiments comprises means for changing a first device into a second device as a response to a command entered by the user. The software 311 can also receive or request information from the central processing unit 307 on whether the input means 308 are active or inactive. Based on this information the software 311 can disconnect the inactive device from the session and correspondingly connect the active device to the session. According to one embodiment, the portable device also comprises means for determining the location information of the device. The embodiment of FIG. 3 shows GPS (Global Positioning System) 314 for determining the location of the device. Alternatively, the location information can be received/requested from the network, when using a mobile phone network, for example. In this case the software 311 can monitor the distance between the first and second device. As the distance increases, the second device is connected to the session and the first device is disconnected from the session. Alternatively, as the distance decreases, the second device is connected to the session and the first device is disconnected from the session.

Figure 4:
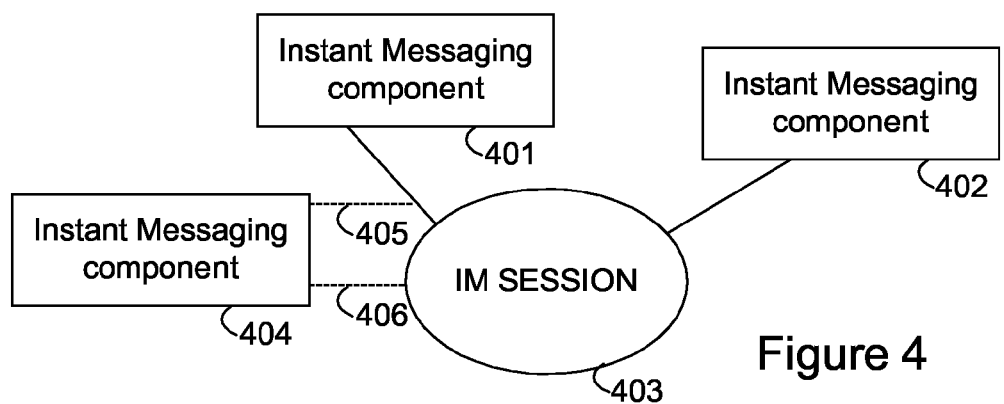
FIG. 4 illustrates an apparatus according to one embodiment of the invention.

An apparatus according to one embodiment of the invention is shown in FIG. 4. The figure illustrates the connection request component 401 of the first device and the connection request component 402 of a device administered by a different, third user. The connection request components 401, 402 are typically executable programs. Between the connection request components 401, 402 of the first and the third device, a session 403 and typically also a real-time, interactive conversation connection, have been created. Typically the session is created using a server, whereat the connection is controlled and administered by the server 403. The connection can be a direct connection between the devices created by means of the components 401, 402 of the devices. In one embodiment the devices are connected through their own servers. According to the embodiment, the connection is created in such a way that the connection request component 401 of the first device is connected to a given server and this server communicates with another server, to which second server the connection request component 402 of the second device is connected.

According to the invention, the user of the first device 401 wants to use the second device 404 instead of the first device. Then the information related to the session is transmitted, according to the embodiments of the invention, from the first device 401 to the second device 404 of the same user. The second device 404 receives information on the session, in which the first device 401 is involved during the information transmission. The received information can be processed with the second device 404 for example in such a way that the device information of the first device is modified to apply to the second device 404. If necessary other information related to the session, which differs between the first 401 and the second 404 device, can also be modified.

According to the first embodiment of the invention, the session of the first device 401 remains unbroken during the information transmission and device change. A second device 404 is specified as the terminal device of the session. An example of specifying the second terminal device 404 is shown in FIG. 4 with a broken line 405. In this example, the server 403 knows nothing about the device change, but imagines that the same original first device 401 is still involved in the session. In this example, the device identification, the address data of the recipient and similar data are modified in the gateway between the second device 404 and the server 403 in such a manner that the server 403 does not know about the object change. The new recipient can be determined for example on the server of the network, to which the second device 404 belongs. The new recipient can also be determined for example in the firewall of the device or the local network, or in the home register of the mobile communicating network or at the mobile communicating (digital exchange) center. According to the first embodiment, the address data of the messages transmitted by the server 403, directed to the first device 401, is converted in the connection gateway between the server 403 and the device 401 such that the destination of the messages becomes the user's second device 404. Correspondingly, the messages delivered by the second device 404 are converted in the gateway before their reception by the server 403.

According to the second embodiment, messages can be delivered to the server 403 from the user's second device 404 such that the other connection information remains the same. In this embodiment the user information and the message history remain unchanged. Only the device information of the other party of the conversation connection 403 is changed such that the messages are in fact directed, instead of the first device 401, to the second device 404 of the same user. In this embodiment the server 403 knows about the device change, but the other party of the connection 402 does not. The server 403 can be a connection server shared by the users or the server of the user that changes the device, which communicates with the servers of the other users connected to the session. The server 403 configures the user's device change in such a way that the session remains unchanged without breaking and the other users do not necessarily know anything about the change. The server 403 accepts that the session continues unchanged while the user's device information and possibly the transmission protocol change.

According to the third embodiment, as the device changes, a new session is in fact started, but the initiation of and log-in to the new session are automatically carried out in the background without the user detecting it. The new session can be created for example in such a manner that the server 403 creates a connection request such as it would be received from the other party 402 of the connection. This connection request is transmitted to the second device 404 that is to be taken into use. The device 404 automatically creates an accepting feedback message, in which the required device information, technical data and parameters related to this second device 404 are delivered to the server 403. In addition, the latest messages delivered in the original session 403 are typically displayed on the second device 404. In this embodiment the change is automatic and the user does not necessarily detect the establishment of the new connection.

According to one further embodiment of the invention the first device 401 and the second device 404 are specified as the terminal devices of the session as shown in FIG. 4 with a broken line 406. In this example, the server 403 knows nothing about the device change, but imagines that the same original first device 401 is still involved in the session. In this example, the device identification, the address data of the recipient and similar data are modified in the gateway between the first device 401, the second device 404 and the server 403 in such a manner that the server 403 does not know about the object change. According to this embodiment, the address data of the messages transmitted by the server 403, directed to the first device 401, is converted in the connection gateway between the server 403 and the device 401 such that the destination of the messages becomes both the first device 401 and the second device 404. Correspondingly, the messages delivered by the first device 401 and the second device 404 are converted in the gateway before their reception by the server 403. In this embodiment the latest messages delivered in the original session 403 are transferred to the first device 401 and to the second device 404 which is controlled by the first device 401 e.g. via link 406, and typically the messages are displayed on the second device 404. For example, user's cellular phone is viewed through a TV screen in home environment.

According to another further embodiment the first device 401 is connected to an additional device (not shown) comprising output means and being under the control of the first device 401 such that the output means of the first device and the additional device are shared. In this embodiment the messages according to the invention delivered in the original session 403 are transferred to the first device 401 and then forwarded to the second device 404 which is controlled by the first device 401 e.g. via link 406, and typically the messages are presented on the second device 404 and the additional device. As an example, user's cellular phone is viewed through a laptop and a video projector connected to the laptop. As another example, user's cellular phone is listened through a car radio or MP-3 player having a speech synthesizer being able to receive IM messages and repeat them.

The invention claimed is:

1. A method comprising:
changing a communication session from a first user terminal device to a second user terminal device in response to a monitored distance between the first user terminal device and the second user terminal device,
wherein the changing of the communication session from the first user terminal device to the second user terminal device is initiated in response to the monitored distance decreasing to a predetermined value,
wherein session information is transmitted from the first user terminal device to the second user terminal device,
wherein the second user terminal device is connected to the communication session based on the session information, and
wherein the first user terminal device is disconnected from the session such that the session is maintained with the second user terminal device.

2. A method according to claim 1, wherein the session information comprises one or more of previous messages received by the first user terminal device via the communication session and information regarding the participant or participants of the communication session.

3. A method according to claim 1, wherein the session information is modified such that device information related to the first user terminal device is modified to apply to the second user terminal device.

4. A method according to claim 1, wherein the communication session is changed to the second user terminal device in response to at least one of a detected activation of the second user terminal device and a detected deactivation of the first user terminal device.

5. An apparatus comprising:
at least one processor and at least one memory including computer software configured to, with the at least one processor, cause the apparatus at least to perform:
changing communication session from a first user terminal device to a second user terminal device in response to a monitored distance between the first user terminal device and the second user terminal device,
wherein the changing of the communication session from the first user terminal device to the second user terminal device is initiated in response to the monitored distance decreasing to a predetermined value,
wherein session information is transmitted from the first user terminal device to the second user terminal device,
wherein the second user terminal device is connected to the session based on the session information, and
wherein the first user terminal device is disconnected from the session such that the session is maintained with the second user terminal device.

6. An apparatus according to claim 5, wherein the session information comprises one or more of previous messages received by the first user terminal device via the communication session and information regarding the participant or participants of the communication session.

7. An apparatus according to claim 5, wherein the second user terminal device modifies the session information such that device information related to the first user terminal device is modified to apply to the second user terminal device.

8. An apparatus according to claim 5, wherein the session information is transmitted via a direct connection between the first user terminal device and the second user terminal device.

9. An apparatus according to claim 5, wherein the communication session is changed to the second user terminal device in response to at least one of a detected activation of the second user terminal device and a detected deactivation of the first user terminal device.

10. A user terminal device, comprising:
at least one processor and at least one memory including computer software configured to, with the at least one processor, cause the user terminal device at least to perform,
determining to transmit session information to a second user terminal device, the session information regarding a communication session to which the user terminal device is connected, and
disconnecting the user terminal device from the communication session after the second user terminal device is connected to the communication session based on the session information, and
wherein the determining to transmit the session information and disconnecting the user terminal device from the communication session are performed in response to a monitored distance between the user terminal device and the second user terminal device, and are initiated in response to the monitored distance decreasing to a predetermined value.

11. A user terminal device, comprising:
at least one processor and at least one memory including computer software configured to, with the at least one processor, cause the user terminal device at least to perform,
receiving session information from a first user terminal device, the session information regarding a communication session to which the first user terminal device is connected, and
connecting the user terminal device to the communication session based on the session information, and
wherein the receiving session information and connecting the user terminal device to the communication session are performed in response to a monitored distance between the user terminal device and the first user terminal device, and are initiated in response to the monitored distance decreasing to a predetermined value.

12. A non-transitory computer-readable storage medium carrying one or more sequences of one or more instructions which, when executed by one or more processors, cause an apparatus to at least:
changing communication from a first user terminal device to a second user terminal device in response to a monitored distance between the first user terminal device and the second user terminal device,
wherein the changing of the communication session from the first user terminal device to the second user terminal device is initiated in response to the monitored distance decreasing to a predetermined value, wherein session information is transferred from the first user terminal device to the second user terminal device, wherein the second user terminal device is connected to the session based on the session information, and wherein the first user terminal device is disconnected from the session such that the session is maintained with the second user terminal device.

13. The non-transitory computer-readable storage medium according to claim 12, wherein the communication session is changed from the first user terminal device to the second user terminal device in response to at least one of a detected activation of the second user terminal device and a detected deactivation of the first user terminal device.

14. A method according to claim 1, wherein the session information is transmitted via a direct connection between the first user terminal device and the second user terminal device.

15. A method according to claim 14, wherein the direct connection is achieved via a short range communication comprising one of a wired connection, a Bluetooth connection, an infrared connection, a wireless local area network connection, and a radio frequency connection.

16. A method according to claim 1, wherein the disconnecting of the first user terminal device from the session is initiated in response to the monitored distance increasing to a predetermined value.

17. An apparatus method according to claim 8, wherein the direct connection is achieved via a short range communication comprising one of a wired connection, a Bluetooth connection, an infrared connection, a wireless local area network connection, and a radio frequency connection.

18. A apparatus according to claim 5, wherein the disconnecting of the first user terminal device from the session is initiated in response to the monitored distance increasing to a predetermined value.

19. A user terminal device according to claim 10, wherein the session information is transmitted via a direct connection between the user terminal device and the second user terminal device.

20. A user terminal device according to claim 11, wherein the session information is received via a direct connection between the first user terminal device and the user terminal device.

21. The non-transitory computer-readable storage medium according to claim 12, wherein the session information is received via a direct connection between the first user terminal device and the second user terminal device.

* * * * *